(12) United States Patent
Kivisto

(10) Patent No.: US 11,685,019 B2
(45) Date of Patent: Jun. 27, 2023

(54) POWER CORD AND VACUUM TUBE MANAGER

(71) Applicant: National Flooring Equipment, Inc., Minneapolis, MN (US)

(72) Inventor: John A. Kivisto, Oak Grove, MN (US)

(73) Assignee: National Flooring Equipment Inc., Minneapolis, MN (US)

( * ) Notice: Subject to any disclaimer, the term of this patent is extended or adjusted under 35 U.S.C. 154(b) by 861 days.

(21) Appl. No.: 16/459,986

(22) Filed: Jul. 2, 2019

(65) Prior Publication Data
US 2021/0001451 A1 Jan. 7, 2021

(51) Int. Cl.
*B24C 9/00* (2006.01)
*F16L 3/10* (2006.01)
*B24C 5/00* (2006.01)

(52) U.S. Cl.
CPC .............. *B24C 9/00* (2013.01); *B24C 5/00* (2013.01); *B24C 9/003* (2013.01); *F16L 3/1075* (2013.01)

(58) Field of Classification Search
CPC .. B24C 5/00; B24C 9/00; B24C 9/003; A47L 11/202; A47L 11/4005; A47L 11/4075; A47L 9/24; A47L 9/242; A47L 9/248; F16L 3/1075
See application file for complete search history.

(56) References Cited

U.S. PATENT DOCUMENTS

| | | | | |
|---|---|---|---|---|
| 3,965,526 A | * | 6/1976 | Doubleday | A47L 9/246 15/377 |
| 4,106,165 A | * | 8/1978 | Clowers | B65H 75/4423 242/381.3 |
| 2003/0127904 A1 | | 7/2003 | Due | |
| 2005/0155592 A1 | | 7/2005 | Due | |
| 2005/0229988 A1 | * | 10/2005 | Asta | F16L 3/2334 138/110 |
| 2007/0089262 A1 | * | 4/2007 | Drevitson | A47L 5/14 15/353 |
| 2008/0143097 A1 | * | 6/2008 | Canale | A47L 9/246 285/7 |
| 2009/0031526 A1 | * | 2/2009 | Linhart | A47L 9/327 15/410 |
| 2011/0162164 A1 | * | 7/2011 | Shibata | A47L 9/2868 248/68.1 |
| 2014/0157557 A1 | | 6/2014 | Diep et al. | |
| 2017/0251895 A1 | * | 9/2017 | Lutz | A47L 5/36 |
| 2019/0140390 A1 | * | 5/2019 | Refai | H01R 13/582 |

FOREIGN PATENT DOCUMENTS

| | | | | |
|---|---|---|---|---|
| DE | 102004004010 B4 | * | 2/2006 | ............. A47L 9/244 |
| GB | 2444569 A | * | 6/2008 | ............... A47L 9/26 |
| JP | 2009297845 | | 12/2009 | |

OTHER PUBLICATIONS

DE-102004004010-B4 EspaceNet Translation (Year: 2006).*

* cited by examiner

*Primary Examiner* — Joel D Crandall
*Assistant Examiner* — Makena S Markman
(74) *Attorney, Agent, or Firm* — Brad J. Thorson; DeWitt LLP

(57) ABSTRACT

A management device simultaneously clamps both the power cord and the vacuum tube of a floor preparation machine to appropriately direct the power cord and vacuum tube and protect from damage the power cord, vacuum tube cord plug and machine socket associated with the power cord and fitting associated with the vacuum tube.

18 Claims, 3 Drawing Sheets

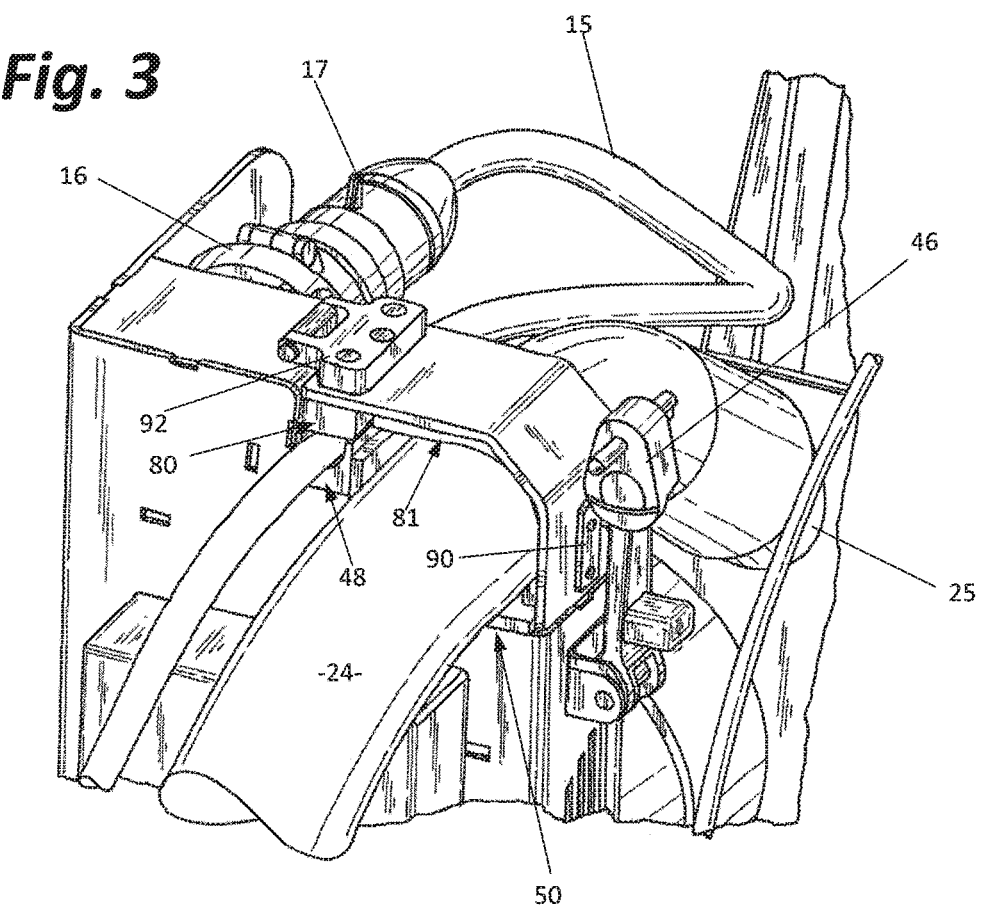

POWER CORD AND VACUUM TUBE MANAGER

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates to equipment used to prepare a floor for refinishing. More specifically, the present invention relates to such equipment that is electrically powered and adapted to be coupled to a vacuum system to control dust and debris.

II. Discussion of the Prior Art

Various types of devices are employed to prepare a floor for refinishing. These include floor preparation machines designed to scrape tile and carpet from a floor, polishers, grinders, burnishers and shot blasters. National Flooring Equipment, Inc. of Minneapolis, Minn. has been a leading manufacturer and distributor of such equipment for sixty years.

Many concrete floors in commercial building and residential garages are finished with epoxy coatings. Over time resurfacing is required. The original surface must be roughened up to permit the new layer of epoxy to properly adhere to the floor. This step of roughening the floor may be performed using a grinder or a shot blaster.

A shot blaster is designed to blast small metal pellets (shot) onto the floor's surface. Shot blasters typically include a reservoir containing a supply of shot, a mechanism for metering the delivery of the shot, an impeller that provides the force to blast the metered shot at the floor, and plenum attached to a powerful vacuum that collects the used shot returning it to the reservoir and the dust and debris generated by the shot blasting processes placing it in a collection bag. National Flooring Equipment offers a series of shot blasters of different sizes and configurations. These include the National HB5 handheld shot blaster, the National A30 self-propelled shot blaster, and the National A12 ride-on shot blaster.

While all the shot blasters offered by National are of high quality and effectively treat the floor, National is continually trying to improve its equipment offerings.

SUMMARY OF THE INVENTION

The present invention provides various improvements related to the control of electrical cords and vacuum tubes used with shot blasters and other types floor preparation equipment. These improvements are directed to power cord and vacuum tube management.

A shot blasting machine typically comprises a power cord having a plug and a socket adapted mate with the plug. A shot blasting machine, also typically a vacuum tube and a fitting used to couple the end of the vacuum tube to the machine. Proper management of both the power cord and vacuum tube will reduce the risks of the cord or vacuum tube becoming unplugged from the machine during operation and of damage to the plug, cord, socket, vacuum tube or fitting.

Suitable cord and vacuum tube management may be achieved by providing a manager comprising a first clamping member, a second clamping member and a latch. One of the first and second clamping members is affixed to the floor preparation machine. The other of the first and second clamping members is adapted to move between open and closed positions. The latch is adapted to secure the first and second clamping members in the closed position.

The first clamping member includes a cord receiving zone and a vacuum tube receiving zone.

The cord receiving zone of the first clamping member comprises a channel open at its two ends so that a cord can extend through the channel. The channel is defined by a base having a concave surface and first and second opposing spaced-apart side walls extending from the base. An opening extends between the first and second opposing spaced-apart side walls. This opening is adapted to permit a section of a cord to be placed in the channel so that the cord extends through the channel and out the openings at the two ends of the channel. The first of the opposing parallel side walls has at least one first merlon and at least one first embrasure. The second of the opposing parallel side walls has at least one second merlon and at least one second embrasure. The first and second merlons are aligned with each other as are the first and second embrasures.

The vacuum tube receiving zone of the first clamping member has open ends and comprises a first wall having two end wall sections extending along planes that are mutually orthogonal to each other. These sections are joined together by at least one intermediate wall section.

The second clamping member comprising a cord capture zone adapted to cover the cord receiving zone and a vacuum tube capture zone adapted to cover the vacuum tube receiving zone.

The cord capture zone has at least one third merlon and at least one third embrasure. The third merlons of the cord capture zone are adapted to be interlaced with the first merlons of the first side wall and the second merlons of the second side wall. Further, the second embrasures of the cord capture zone are adapted to receive the first merlons of the first side wall and the second merlons of the second side wall.

The vacuum tube capture zone comprises a second wall having two end sections extending along planes that are mutually orthogonal to each other joined together by at least one intermediate wall section.

The latch is adapted to selectively secure the second clamping member in the closed position. The latch will typically be adapted to interact with a catch mounted to the second clamping member to selectively secure the second clamping member in a closed position with respect to the first clamping member.

When a section of the power cord is placed in the cord receiving zone, a section of the vacuum tube is placed in the vacuum tube receiving zone, and the second clamping member is in the closed position and secured by the latch, a pinching force is applied to both the power cord and the vacuum tube. This pinching force restricts sliding movement of the power cord and the vacuum tube through the power cord and vacuum tube manager. This pinching force also serves to prevent any strain on the power cord and vacuum tube from being transferred along the power cord and vacuum tube past the power cord and vacuum tube manager. The electrical socket, the electrical plug, cord, vacuum tube and the fitting used to couple the vacuum tube to the floor preparation machine are thus protected from damage. Likewise, the manager prevents the cord and vacuum tube from inadvertently becoming unplugged from the machine.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts:

FIG. 3 is a perspective view of the power cord and vacuum tube manager in the unlatched and open position.

DESCRIPTION OF THE PREFERRED EMBODIMENT

Figure 1:
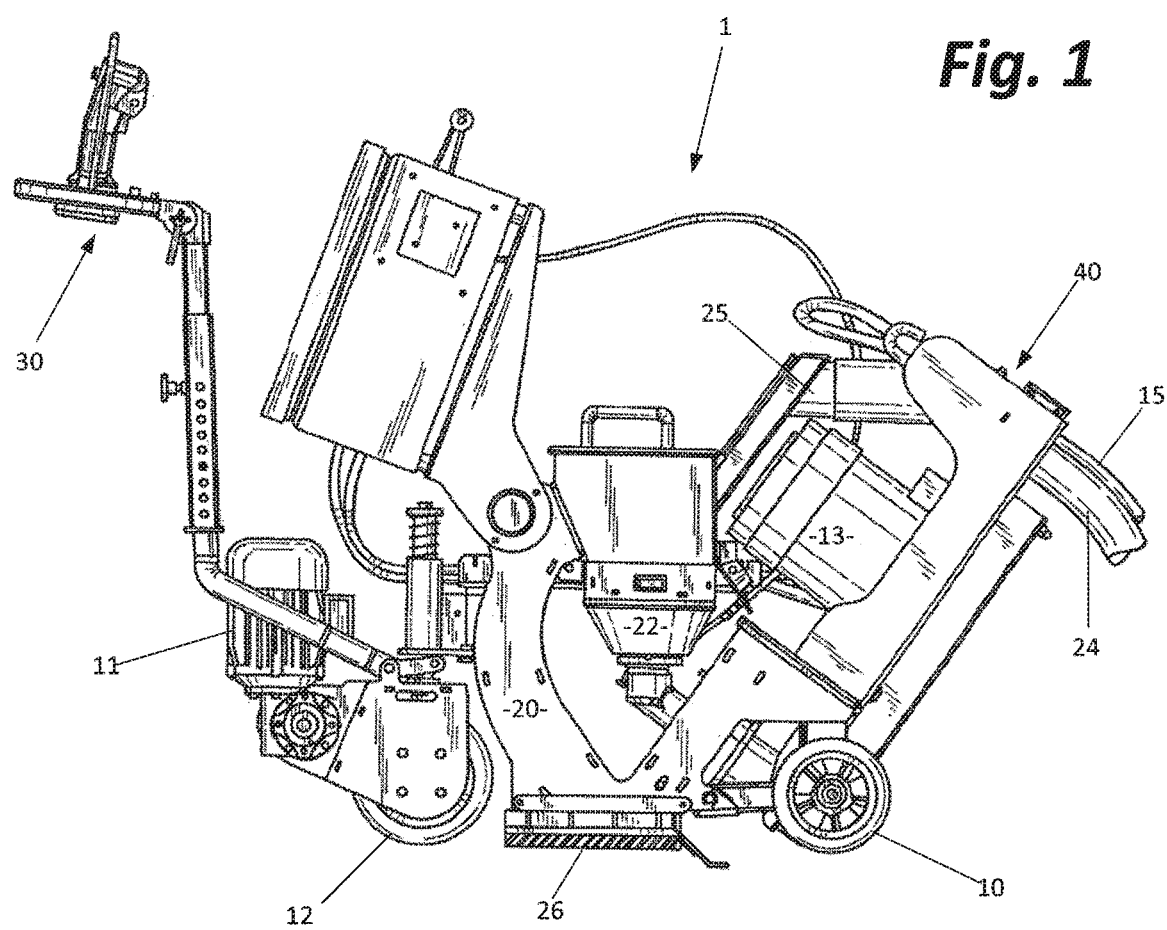
FIG. 1 is a side view of a shot blaster.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

A self-propelled shot blasting machine 1 is shown in FIG. 1. The machine 1 sits on a pair of rear wheels 10 and a front drive wheel 12.

Figure 2:
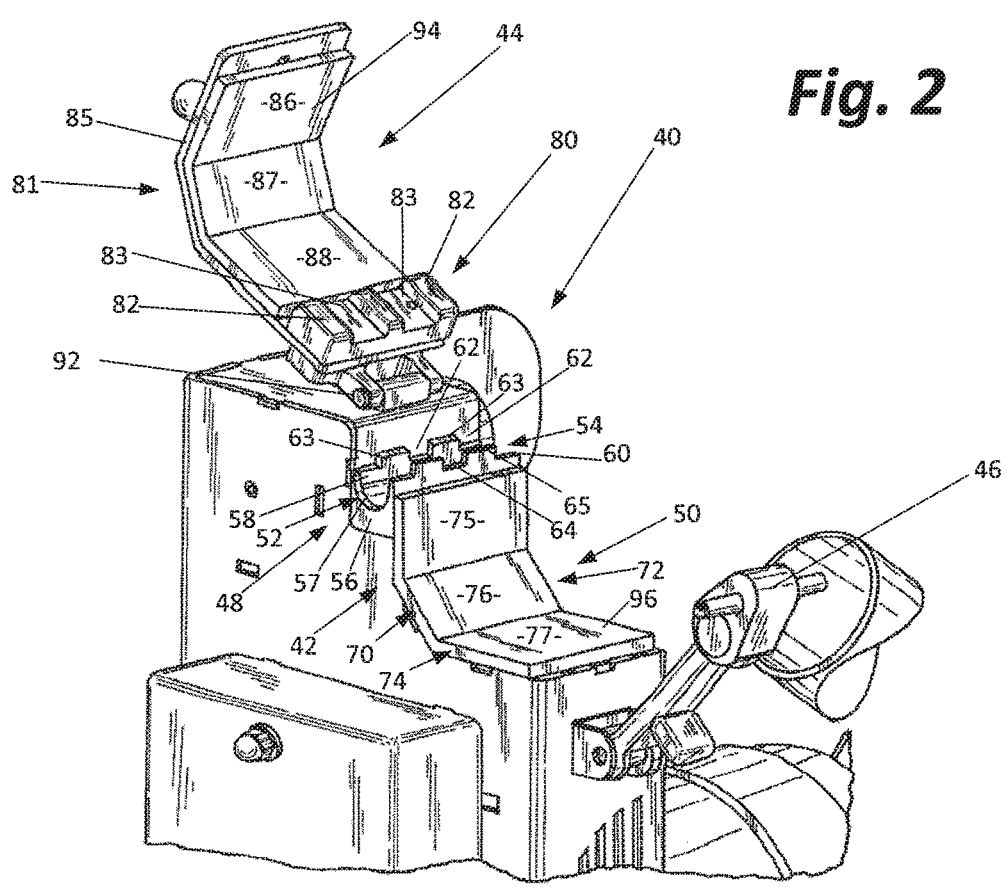
FIG. 2 is a perspective view of a power cord and vacuum tube manager in the closed and latched position.

Machine 1 is driven by an electric motor 11 coupled to drive wheel 12. The machine 1 has a second motor 13 that drives a blast wheel (not shown). A single cord 15 is used to power both motors 11 and 13. As shown in FIG. 2, the machine 1 has a socket 16 and the cord has a plug 17 that mates with the socket 16 to provide electrical power to the machine 1 and its motors 11 and 13.

The machine 1 also has a plenum 20 incorporating a hopper 22. The plenum 20 is coupled to one end of a vacuum tube 24 by a fitting (or port) 25. The other end of the vacuum tube 24 is coupled to a vacuum (not shown).

Hopper 22 is filled with shot prior to use. The vacuum is then energized to create air flow through the vacuum tube 24 and plenum 20. The motors 11 and 13 are then energized. Energizing motor 13 causes the shot wheel (not shown) to spin. Shot is metered from hopper 22 through a valve (not shown) to the shot wheel which accelerates the shot toward the floor in an area contained by a suction head 26. After the shot impacts the floor's surface roughening the surface, the shot, together with floor debris and dust, is carried through the plenum 20 by the air flow. The dust and debris are carried to a collection bag (not shown) associated with the vacuum. The shot is deposited back into the hopper 22 and reused.

Operation of the two motors 11 and 13 and the speed and direction of the machine are controlled by ergonomic controller 30.

A power cord and vacuum tube manager 40 is provided for several reasons. First, the power cord and vacuum tube manager 40 reduces the risk that the plug 17 of the power cord 15 will become unplugged from the socket 16 of machine 1. Second, the power cord and vacuum tube manager 40 reduces the risk of damage to both the plug 17 and the socket 16. Third, the power cord and vacuum tube manager 40 reduces the risk of the vacuum tube 24 becoming detached from the fitting 25. Fourth, the power cord and vacuum tube manager 40 reduces the risk of the fitting 25 (or the end of the vacuum hose 24 secure to the fitting 25) becoming damaged.

The cord and vacuum tube manager 40 includes a first clamping member 42, a second clamping member 44, and a latch 46. The first clamping member 42 is fixed to the machine 1. This first clamping member 42 includes a cord receiving zone 48 and a vacuum tube receiving zone 50.

The cord receiving zone 48 of the first clamping member 42 comprises a channel having open ends 52/54. The channel of the first clamping member 42 has a base 56 having a concave surface 57 and first and second opposing, parallel and spaced-apart side walls 58/60. The first side wall 58 terminates with a plurality of first embrasures 62 and a plurality of first merlons 63. Likewise, the second side wall 60 terminates with a plurality of second embrasures 64 and a plurality of second merlons 65. The first embrasures 62 and second embrasures 64 are aligned with each other. Likewise, the first merlons 63 and second merlons 65 are aligned with each other.

The vacuum tube receiving zone 50 of the first clamping member 42 has open ends 70/72 and comprises a plurality of wall sections. As shown, these include a first wall 74 having two end sections 75 and 77 extending along planes that are mutually orthogonal to each other. These sections are joined together by at least one intermediate wall section 76. The inner vacuum tube engaging side or surface of this wall 74 may be lined with a foam pad.

The second clamping member 44 is movable between an open position and a closed position. In some embodiments, a hinge 100 is employed to couple the second clamping member 44 to the first clamping member 42 such that the second clamping member 44 pivots about the hinge 92.

The second clamping member comprising a cord capture zone 80 adapted to cover the cord receiving zone 48 and a vacuum tube capture zone 81 adapted to cover the vacuum tube receiving zone 50.

The cord capture zone 80 has at least one member adapted engage a cord positioned in the cord receiving zone. As shown, the cord capture zone has a plurality of third merlons 82 and a plurality of third embrasures 83.

The third merlons 82 of the cord capture zone 48 are adapted to be interlaced with the first merlons 63 of the first side wall 58 and the second merlons 65 of the second side wall 60. Further, the third embrasures 83 of the cord capture zone are adapted to receive the first merlons 63 of the first side wall 58 and the second merlons 65 of the second side wall 60. In the embodiment shown, the third merlons adapted engage a cord positioned in the cord receiving zone.

The vacuum tube capture zone 81 comprises a second wall 85 also having a plurality of wall sections. As shown, these include two end sections 86/88 extending along planes that are mutually orthogonal to each other joined together by an intermediate wall section 87. The inner vacuum tube engaging side or surface of this wall 85 may also be lined with a foam pad.

The latch 46 is adapted to selectively secure the second clamping member 44 in the closed position. The latch 46 will typically be adapted to interact with a catch 90 mounted to the second clamping member 44 to selectively secure the second clamping member 44 in a closed position with respect to the first clamping member 42.

When a section of the power cord 15 is placed in the cord receiving zone 48, a section of the vacuum tube 24 is placed in the vacuum tube receiving zone 50, and the second clamping member 44 is in the closed position and secured by the latch 46 engaging the catch 90, a pinching force is applied to both the power cord 15 and the vacuum tube 24. This pinching force restricting sliding movement of the power cord 15 and the vacuum tube 24 through the power cord and vacuum tube manager 40. This pinching force also serves to prevent any strain on the power cord 15 and vacuum tube 24 from being transferred along the power cord 15 and vacuum tube 24 past the power cord 15 and vacuum tube manager 40. The electrical socket 16, the electrical plug 17 and the fitting 25 are thus protected from damage and becoming in advertently unplugged. Likewise, the manager 40 restricts movement of the cord 15 which could cause the plug 17 from being inadvertently removed from socket 16. Movement of the tube 24 is also restricted by the manager 40 so that the tube 24 is not inadvertently decoupled from the fitting 26.

Various modifications may be made without deviating from the invention. As shown, the second clamping member 44 is moved in and out of the closed position by rotating the clamping member about a hinge 92. The hinge 92 can be eliminated and a second latch added to secure the first and second clamping members 42/44 in their closed position. Other types of latches (e.g., nuts and bolts) may be used to secure the two clamping members 42/44 together in the closed position. The number of merlons and embrasures may be varied. The end sections and intermediate section of both the vacuum tube receiving zone 50 and the vacuum tube capture zone 81 may be curved rather than planar. Further, the inside surface of these structures may be lined with foam pads such as 94/96 or not.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A power cord and vacuum tube manager comprising a first clamping member, a second clamping member and a latch, wherein at least one of said first clamping member and said second clamping member is affixed to a machine and at least one of said first clamping member and said second clamping member is movable between an open and a closed position;
   a. one of said first clamping member and second clamping member comprising a cord receiving zone and a vacuum tube receiving zone, said cord receiving zone comprising a channel open at two ends defined by a base and first and second opposing spaced-apart side walls extending from the base, said vacuum tube receiving zone having open ends and comprising a first wall having a first plurality of wall sections;
   b. the other of said first clamping member and the second clamping member comprising a cord capture zone and a vacuum tube capture zone, said cord capture zone comprising at least one member adapted engage a cord positioned in the cord receiving zone, said vacuum tube capture zone comprising a second wall having a second plurality of wall sections;
   c. the latch adapted to selectively secure the second clamping member in the closed position;
   wherein when a section of a power cord is placed in the cord receiving zone and a section of a vacuum tube is placed in the vacuum tube receiving zone and the second clamping member is in the closed position, a pinching force is applied to both the power cord and the vacuum tube restricting sliding movement of the power cord and the vacuum tube through the vacuum tube manager.

2. The power cord and vacuum tube manager of claim 1 wherein the second wall has an inner vacuum tube engaging side lined with a pad.

3. The power cord and vacuum tube manager of claim 1 further comprising a hinge coupled to the second clamping member and wherein the second clamping member is pivotal about said hinge.

4. The power cord and vacuum tube manager of claim 1 wherein first clamping member and second clamping member simultaneously relieve strain on a power cord and a vacuum tube when the latch secures the second clamping member in the closed position.

5. The power cord and vacuum tube manager of claim 1 wherein the second clamping member further comprises a catch.

6. The power cord and vacuum tube manager of claim 5 wherein the latch is movable to engage the catch when the second clamping member in the closed position.

7. A floor preparation system comprising: a power cord; a vacuum tube; and a power cord and vacuum tube manager comprising:
   a. a first clamping member fixed to a floor preparation machine, said first clamping member comprising a cord receiving zone and a vacuum tube receiving zone,
      i. said cord receiving zone having open ends and defined by a concave surface having a first side and a second side, a first side wall projecting to a first open end from the first side of the concave surface, a second sidewall spaced apart from the first side wall and projecting to a second open end from the second side of the concave surface, the first open end having a plurality of first embrasures and a plurality of first merlons, the second open end having a plurality of second embrasures and a plurality of second merlons, the first embrasures and first merlons of the first open end aligned with the second embrasures and second merlons of the second open end,
      ii. said vacuum tube receiving zone having open ends and comprising a first wall having a first plurality of wall sections;
   b. a second clamping member movable between an open position and a closed position, said second clamping member comprising a cord capture zone adapted to cover the cord receiving zone and a vacuum tube capture zone adapted to cover the vacuum tube receiving zone,
      i. said cord capture zone having a plurality of third merlons and a plurality of third embrasures, the third merlons adapted to extend across the cord receiving zone and be received between the first merlons of the first side wall and the second merlons of the second side wall when the second clamping member is in the closed position, said third merlons further adapted to engage and apply a pinching force to the power cord when a section of the power cord is in the cord receiving zone and the second clamping member is in the closed position thereby restricting sliding movement of the power cord through the power cord and vacuum tube manager;

ii. said vacuum tube capture zone comprising a second wall having a second plurality of wall sections, said second wall adapted to apply a pinching force to the vacuum tube restricting sliding movement of the vacuum tube through the power cord and vacuum tube manager;

c. a latch adapted to selectively secure the second clamping member in the closed position.

8. The floor preparation system of claim 7 further comprising an electrical socket, an electrical plug attached to an end of the power cord adapted to be selectively coupled to the electrical socket, and a fitting to which an end of the vacuum tube is adapted to be attached.

9. The floor preparation system of claim 8 wherein the power cord and vacuum tube manager are adapted to protect the electrical socket, electrical plug and the fitting by preventing strain on the power cord and vacuum tube from being transferred along the power cord and vacuum tube past the power cord and vacuum tube manager to the electrical socket, the electrical plug and the fitting.

10. The floor preparation system of claim 7 wherein the second wall has an inner vacuum tube engaging side lined with a foam pad.

11. The floor preparation system of claim 7 further comprising a hinge coupled to the second clamping member and wherein the second clamping member is pivotal about said hinge.

12. The floor preparation system of claim 7 wherein first clamping member and second clamping member simultaneously relieve strain on the power cord and the vacuum tube when the latch secures the second clamping member in the closed position.

13. The floor preparation system of claim 7 wherein the second clamping member further comprises a catch.

14. The floor preparation system of claim 13 wherein the latch is movable to engage the catch when the second clamping member in the closed position.

15. The floor preparation system of claim 7 wherein the power cord has a section adapted to fit within the cord receiving zone and be pinched between the concave surface and the second merlons when the second clamping member is secured in the closed position by the latch.

16. The floor preparation system of claim 7 wherein the vacuum tube has a section adapted to fit within the vacuum tube receiving zone and be pinched between the first wall and the second wall when the second clamping member is secured in the closed position by the latch.

17. A shot blasting system comprising: a power cord having a plug; a socket adapted mate with the plug; a vacuum tube; a fitting to which the vacuum tube is adapted to be coupled; and a power cord and vacuum tube manager comprising:

a. a first clamping member fixed to a shot blasting machine, said first claiming member comprising a cord receiving zone and a vacuum tube receiving zone, i. said cord receiving zone having open ends and defined by a concave surface having a first side and a second side, a first side wall projecting to a first open end from the first side of the concave surface, a second sidewall spaced apart from the first side wall and projecting to a second open end from the second side of the concave surface, the first open end having a plurality of first embrasures and a plurality of first merlons, the second open end having a plurality of second embrasures and a plurality of second merlons, the first embrasures and first merlons of the first open end aligned with the second embrasures and second merlons of the second open end, ii said vacuum tube receiving zone having open ends and comprising a first wall having first plurality of wall sections;

b. a second clamping member movable between an open position and a closed position, said second clamping member comprising a cord capture zone adapted to cover the cord receiving zone and a vacuum tube capture zone adapted to cover the vacuum tube receiving zone, i. said cord capture zone having a plurality of third merlons and a plurality of third embrasures, the third merlons adapted to extend across the cord receiving zone, be received between the first merlons of the first side wall and the second merlons of the second side wall, and apply a pinching force to a section of the power cord when said section of power cord extends through the cord receiving zone and the second clamping member is in the closed position preventing strain on the power cord from being transferred along the power cord past the power cord and vacuum tube manager to the electrical socket and the electrical plug thereby protecting the electrical socket and electrical plug;

ii. said vacuum tube capture zone comprising a second wall having a plurality of wall sections, said second wall adapted to apply a pinching force to a section of the vacuum tube when said section of the vacuum tube extends through the vacuum tube receiving zone and the second clamping member is in the closed position restricting sliding movement of the vacuum tube through the power cord and vacuum tube manager preventing strain on the vacuum tube from being transferred along the vacuum tube past the power cord and vacuum tube manager to the fitting thereby protecting the fitting;

c. a latch adapted to selectively secure the second clamping member in the closed position.

18. The shot blasting system of claim 17 wherein the second clamping member further comprises a catch.

* * * * *